(12) United States Patent
Shibayama

(10) Patent No.: US 8,456,502 B2
(45) Date of Patent: Jun. 4, 2013

(54) OPTICAL SCANNER AND IMAGE FORMING APPARATUS USING THE SAME

(75) Inventor: Yasuyuki Shibayama, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 122 days.

(21) Appl. No.: 13/045,112

(22) Filed: Mar. 10, 2011

(65) Prior Publication Data

US 2011/0221856 A1    Sep. 15, 2011

(30) Foreign Application Priority Data

Mar. 11, 2010  (JP) ................................. 2010-054753

(51) Int. Cl.
*B41J 2/385*    (2006.01)
*B41J 15/14*    (2006.01)
*B41J 27/00*    (2006.01)

(52) U.S. Cl.
USPC ........... 347/259; 347/134; 347/137; 347/241; 347/244; 347/256; 347/258; 347/260; 347/261

(58) Field of Classification Search
None
See application file for complete search history.

(56) References Cited

U.S. PATENT DOCUMENTS

| | | | |
|---|---|---|---|
| 5,815,301 A | 9/1998 | Naiki et al. | |
| 5,943,153 A | 8/1999 | Naiki et al. | |
| 6,104,523 A * | 8/2000 | Ang | 359/216.1 |
| 6,509,995 B1 | 1/2003 | Suzuki et al. | |
| 6,606,179 B2 | 8/2003 | Suzuki et al. | |
| 6,801,351 B2 | 10/2004 | Suzuki et al. | |
| 2004/0136043 A1* | 7/2004 | Iizuka | 359/204 |
| 2005/0128549 A1* | 6/2005 | Yoshikawa et al. | 359/208 |
| 2007/0253047 A1 | 11/2007 | Ichii et al. | |
| 2008/0192319 A1* | 8/2008 | Miyatake et al. | 359/204 |
| 2009/0317137 A1 | 12/2009 | Akatsu et al. | |
| 2010/0315477 A1 | 12/2010 | Shibayama | |

FOREIGN PATENT DOCUMENTS

| | | |
|---|---|---|
| JP | 4-101112 | 4/1992 |
| JP | 8-15625 | 1/1996 |
| JP | 8-160330 | 6/1996 |
| JP | 3267098 | 1/2002 |
| JP | 3483129 | 10/2003 |
| JP | 2008-76712 | 4/2008 |

* cited by examiner

*Primary Examiner* — Matthew Luu
*Assistant Examiner* — Kendrick Liu
(74) *Attorney, Agent, or Firm* — Oblon, Spivak, McClelland, Maier & Neustadt, L.L.P.

(57) ABSTRACT

An optical scanner, which scans at least one scanned face by a light beam, includes a light source having a plurality of light emitting points, an optical system before a light deflector configured to form a plurality of light beams from the light source, a light deflector configured to deflect the light beams via the optical system before a light deflector and scan the deflected light beams, and a scanning optical system configured to focus on the scanned face the light beams deflected and scanned by a deflection face of the light deflector, the optical system before a light deflector including a first optical element having a negative power at least in a deflecting and scanning vertical direction, a second optical element having a power only in a deflecting and scanning direction and a third optical element having a power only in the deflecting and scanning vertical direction.

14 Claims, 13 Drawing Sheets

OPTICAL SCANNER AND IMAGE FORMING APPARATUS USING THE SAME

PRIORITY CLAIM

The present application is based on and claims priority from Japanese Patent Application No. 2010-054753, filed on Mar. 11, 2010, the disclosure of which is hereby incorporated by reference in its entirety.

BACKGROUND OF THE INVENTION

1. Field of the Invention

The present invention relates to an optical scanner and an image forming apparatus using the optical scanner, for example, a digital copier, a laser printer, a laser plotter and a laser facsimile.

2. Description of the Related Art

In a general optical scanner which has been widely known relating to a laser printer and the like, a light beam is deflected by a light deflector, the deflected light beam is focused on a surface to be scanned (hereinafter, referred to as scanned surface) as minute spot light, and the scanned surface is scanned at a constant speed in the main-scanning direction by this spot light. Namely, in such an optical scanner, laser light emitted from a laser light source, for example, is deflected and reflected by the light deflector, the scanned surface such as an image carrier is scanned by this laser light, and the intensity of the laser light is modulated (for example, on, off) in accordance with an image signal, so that an image is formed on the scanned surface.

Recently, with the increase in speed, the development in resolution, and the increase in a writing width of an image forming apparatus, the number of scanning beams for use in an optical scanning system is more likely to be increased, and a color image forming apparatus having a plurality of optical scanners using a plurality of beams has been generally used. As a light source for the above-described beams, for example, a semiconductor laser array in which light-emitting points are one-dimensionally arranged at predetermined intervals and a surface-emitting laser array in which light-emitting points are two-dimensionally arranged at predetermined intervals are used. In such semiconductor laser arrays, a semiconductor laser array in which the number of beams is increased by synthesizing beams from a plurality of semiconductor laser array light sources can be considered as a light source in which light emitting points are two-dimensionally arranged similar to the surface-emitting laser array.

If the light source which emits a plurality of light beams is used for the optical scanner, it is difficult to adjust the intervals of the scanning lines to be formed on the scanned surface by adjusting the rotation of the light source. In order to address this problem, an anamorphic optical element group is provided in an optical system of the optical scanner, and an adjuster, which adjusts the magnification of the optical system in the sub-scanning direction by adjusting the position of the anamorphic optical element in the optical axis direction, is also provided (refer to, for example, JP H04-101112A, JP H08-15625A, JP 2008-76712A).

On the other hand, as described above, with the increase in a writing width of an image forming apparatus, the size of the scanning lens constituting the optical scanner is increased. For this reason, it is necessary to substitute a glass lens with a resin lens in order to reduce costs. Especially in a tandem writing unit, since the number of optical elements is large, the effect of the cost-cutting becomes more prominent.

However, the resin lens has a problem in that the curvature and the refractive index of the lens face are changed by expansion and contraction with the changes in temperature, and the lens performance, especially the focal position of the light spot on the scanned surface is changed. The change in this focal position increases the diameter of the light spot on the scanned surface, and deteriorates the resolution of the optical scanning. Moreover, in the multi-beam optical scanner, the intervals of the scanning lines to be formed on the scanned surface are changed, so that the quality of the image is deteriorated.

The changes in the focal position and the intervals of the scanning lines by the expansion and contraction of the resin lens with the changes in temperature are generated in an opposite manner between a positive lens and a negative lens. In order to correct these changes, a technique is known, which arranges a pair of resin lenses each having an opposite power on an optical path from a light source to a light deflector, and cancels the changes in the focal position with the temperature changes of the scanning lens (refer to, for example, JP H08-160330A, JP H08-292388A, JP 3483129B).

JP H08-160330A describes an optical scanner including a light source, an incident optical system, a deflector, a scanning optical system and a scanned medium. The incident optical system includes a first optical system (collimated lens) which changes a diverging light beam from the light source into a parallel light beam, and a second optical system which focuses the light from the light source via the first optical system near the deflector in the sub-scanning direction. The first optical system or the second optical system includes a resin optical element (lens) having a negative power in the sub-scanning direction. JP H08-292388A describes an optical scanner including a first focusing unit which focuses near a deflected position of a deflector and has a resin negative lens having a negative refractive power only in the sub-scanning direction, so as to compensate the temperature of the focused position. JP 3483129B describes an optical scanner including an optical system which self-corrects the focal position gap of the light spot on a scanned surface with the changes in environmental temperature by providing between a coupling optical system and a light deflector at least a pair of a resin lens including an anamorphic face having a negative power in both of the sub-scanning direction and the main-scanning direction and a glass lens including an anamorphic face having a positive power at least in the sub-scanning lens.

In order to prevent the deterioration in image quality by the expansion and contraction of the resin lens with the changes in temperature, it is considered to provide a temperature correction function by arranging a resin lens having a negative power and a function which adjusts the magnification in the sub-scanning direction by arranging a plurality of anamorphic optical elements in an optical system before a light deflector in a multi-beam optical scanner using a two-dimensionally arranged light source. However, if a plurality of anamorphic elements is used in the optical system, the focused spot diameter on the scanned surface and the intervals of the scanning lines to be formed on the scanned surface are affected by the arrangement errors of the anamorphic lenses, and a method for solving these problems has not been provided yet.

SUMMARY OF THE INVENTION

It is, therefore, an object of the present invention to provide an optical scanner and an image forming apparatus using the optical scanner, which can control deterioration in an image quality with the changes in temperature by reducing any influence relative to a focused spot diameter on a scanned surface by an arrangement gap of a plurality of anamorphic elements, and intervals of scanning lines to be formed on the scanned surface in an optical system having an adjustment function of a magnification in a sub-scanning direction and a temperature correction function by a plurality of anamorphic lenses.

In order to achieve the above object, one embodiment of the present invention provides an optical scanner, which scans at least one scanned face by a light beam, including: a light source having a plurality of light emitting points; an optical system before a light deflector configured to form a plurality of light beams from the light source; a light deflector configured to deflect the light beams via the optical system before a light deflector and scan the deflected light beams; and a scanning optical system configured to focus on the scanned face the light beams deflected and scanned by a deflection face of the light deflector, the optical system before a light deflector including a first optical element having a negative power at least in a deflecting and scanning vertical direction, a second optical element having a power only in a deflecting and scanning direction and a third optical element having a power only in the deflecting and scanning vertical direction, wherein the second optical element and the scanning optical system satisfy the following condition, where $|\phi m\ 2|$ is an absolute value of a power of the deflecting and scanning direction of the second optical element and $|\phi F\ m|$ is an absolute value of a power of the deflecting and scanning direction of the scanning optical system in a central portion of the deflecting and scanning direction, $|\phi m\ 2|<|\phi F\ m|$.

Preferably, a conjugate ratio of an intermediate focused point of the deflecting and scanning vertical direction by the first optical element and the scanned face is 1 or below.

Preferably, the first optical element satisfies the following condition where $|\phi m\ 1|$ is an absolute value of a power of the first optical element in the deflecting and scanning direction and $|\phi s\ 1|$ is an absolute value of a power of the first optical system in the deflecting and scanning vertical direction, $|\phi m\ 1|\leq|\phi s\ 1|$.

Preferably, the first optical element is a resin lens.

Preferably, the first optical element is an anamorphic lens.

Preferably, an incident face of the first optical element is a concave face or a convex face.

Preferably, the first optical element, the second optical element and the third optical element are fastened to predetermined positions.

Preferably, the light source is a light source array in which a plurality of light-emitting points is one-dimensionally arranged at predetermined intervals.

Preferably, the light source array is an edge-emitting semiconductor laser array.

Preferably, the light source is a light source in which the light beams from the light source arrays are synthesized.

Preferably, the light source is a two-dimensional light source array in which a plurality of light emitting point arrays each having a plurality of light emitting points one-dimensionally arranged at predetermined intervals are arranged at predetermined intervals.

Preferably, the two-dimensional light source array is a surface-emitting laser array.

One embodiment of the present invention also provides an image forming apparatus, including: a photoreceptor; a charging unit configured to charge a surface of the photoreceptor; an optical scanning unit configured to form an electrostatic latent image by irradiating light on the charged surface of the photoreceptor; a development unit configured to form a toner image by toner adhered on the electrostatic latent image; a transfer unit configured to transfer the toner image on the photoreceptor onto a recording medium; and a fusing unit configured to fuse the toner image on the recording medium, wherein the optical scanning unit is the optical scanner.

Preferably, the image forming apparatus further includes a plurality of photoreceptors including the photoreceptor, a plurality of charging units including the charging unit, a plurality of optical scanning units including the optical scanning unit, and a plurality of development units including the development unit, the photoreceptors, the charging units, the optical scanning units and the development units corresponding to respective colors for forming a color image.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DETAILED DESCRIPTION OF THE PREFERRED EMBODIMENT

Hereinafter, an optical scanner and an image forming apparatus according to the embodiment of the present invention will be described with reference to the drawings. Although the embodiment of the present invention has been described below, the present invention is not limited thereto. It should be appreciated that variations may be made in the embodiment described by persons skilled in the art without departing from the scope of the present invention.

Figure 1:
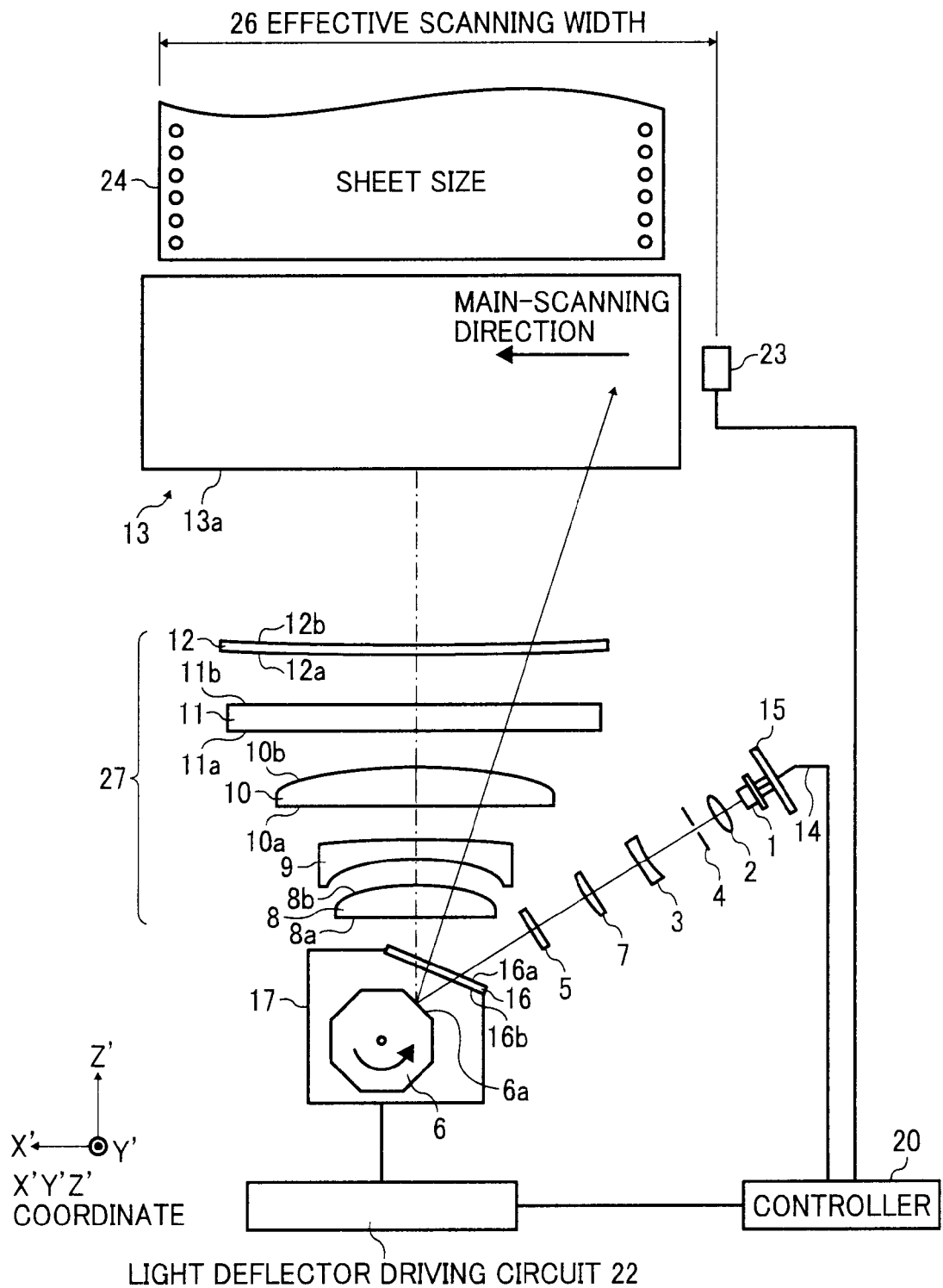
FIG. 1 provides a schematic view illustrating an optical scanner according to one embodiment of the present invention.

FIG. 1 provides a schematic view illustrating an optical scanner according to one embodiment of the present invention. The optical scanner scans at least one surface to be scanned (hereinafter, referred to as a scanned surface) by a light beam, is provided in an image forming apparatus including a copier, a facsimile, a printer and a complex machine, and performs optical recording by using a plurality of light beams (multi-beams). The optical scanner includes a light source having a plurality of light emitting points, an optical system before a light deflector which forms a plurality light beams from the light source, a light deflector which deflects a plurality of light beams via the optical system before a light deflector and scans the deflected light beams, and a scanning optical system which focuses on the scanned surface the light beams deflected and scanned by a deflection surface of the light deflector. The optical system before a light deflector includes a first optical element having a negative power at least in a deflecting and scanning vertical direction, a second optical element having a power only in a deflecting and scanning direction and a third optical element having a power only in a deflecting and scanning vertical direction.

Figure 2:
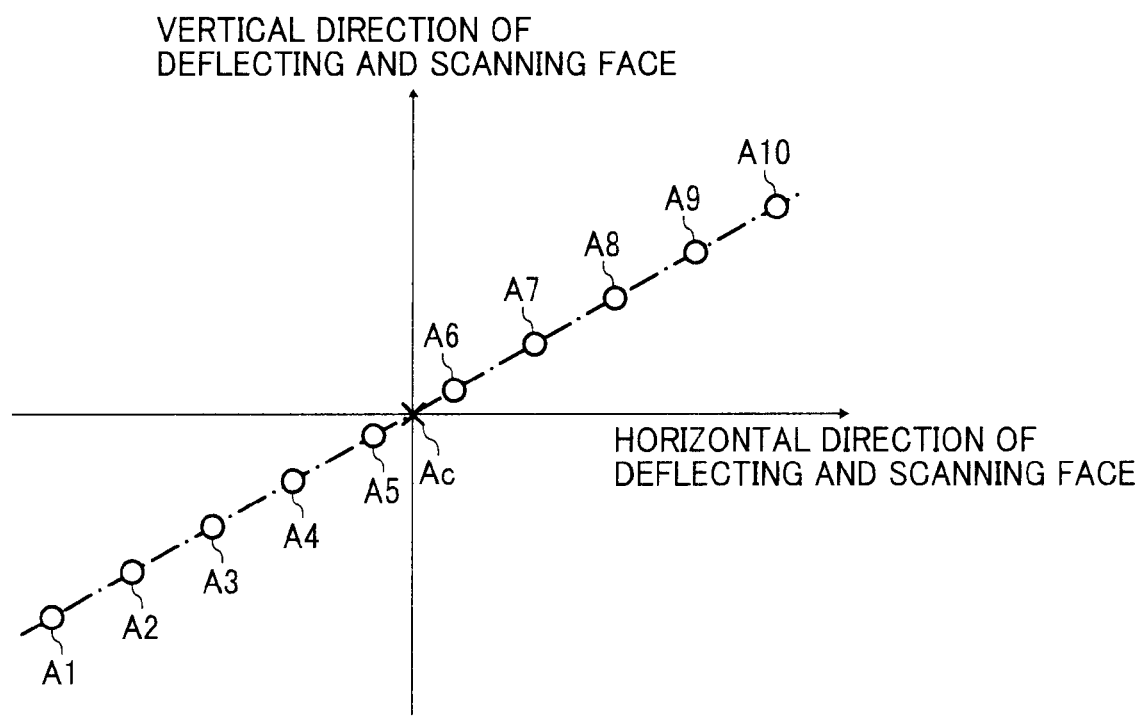
FIG. 2 provides a view illustrating the arrangement of light emitting points of a multi-beam light source of the optical scanner in FIG. 1.
Figure 6:
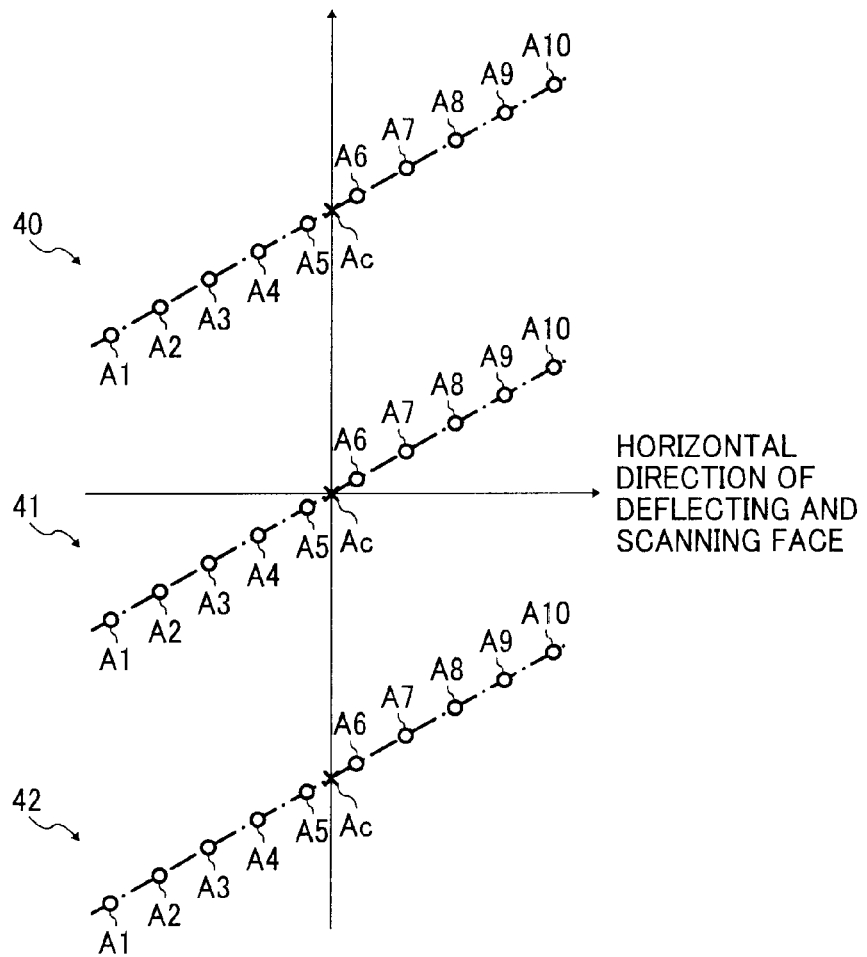
FIG. 6 provides a view describing a multi-beam light source according to another embodiment of the present invention.

A light source 1 illustrated in FIG. 1 is a multi-beam light source (hereinafter, referred to as a light source) which emits multi-beams. FIG. 2 illustrates the arrangement of the light emitting points of the light source 1. Such a multi-beam light source includes, for example, an edge-emitting semiconductor laser. The multi-beam light source is not limited to a one-dimensional array type illustrated in FIG. 2, and a two-dimensional array light source illustrated in FIG. 6 can be used. The light source illustrated in FIG. 6 is a two-dimensional array in which a plurality of light source arrays 40-42 each having 10 light-emitting points A1-A10 one-dimensionally arranged at equal intervals has an arbitrary angle to the horizontal axis and is arranged at equal intervals in the longitudinal axis direction. This type of light source includes a surface-emitting laser.

By using the semiconductor array including the edge-emitting semiconductor laser array and the surface-emitting semiconductor laser array, which is manufactured by using a semiconductor process, as the light source 1, an element having high positional accuracy of an emitting point can be achieved.

Figure 7:
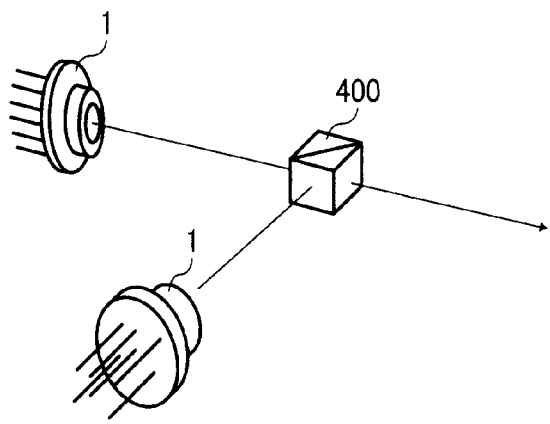
FIG. 7 provides a view illustrating a light source when light beams from a plurality of light sources are synthesized.

As illustrated in FIG. 7, the light from a plurality of light sources 1 may be synthesized by using a beam synthesizing element 400 such as a polarizing prism and a half mirror.

As illustrated in FIG. 2, the light source 1 includes 10 light-emitting points A1-A10. The light-emitting points A1-A10 are one-dimensionally arranged at equal intervals. Each of the light-emitting points A1-A10 is arranged to have a predetermined angle to the vertical direction (longitudinal direction in FIG. 2) of a deflecting and scanning face of a rotating polygon mirror 6 (hereinafter, referred to as a polygon mirror 6). Each of the light-emitting points A1-A10 is driven by a laser driver 15 in accordance with an image data signal 14 from a controller 20 in FIG. 1, and emits light.

If the laser driver 15 is driven in accordance with the image data signal 14 from the controller 20, a plurality of light beams each of which is independently modulated is emitted from the light emitting points of the light source 1, respectively. Each of the light beams emitted from the light source 1 is converted into parallel light by a coupling lens 2. An opening member 4 is disposed in a back focal position of the coupling lens 2, and the size of the light beam in the after-described main-scanning direction and sub-scanning direction is thereby limited. The light beam which has passed through the opening member 4 enters an anamorphic lens 3 which is a first optical element having a negative power (refractive power) different between the deflecting and scanning direction (main-scanning direction) and the deflecting and scanning vertical direction (sub-scanning direction).

It is preferable for the anamorphic lens 3 of the first optical element to have a concave incident face or a convex incident face. In the example illustrated in FIG. 1, the anamorphic lens 3 has the concave incident face. By using the concave incident face, the reflection light from the incident face becomes diverging light, so that the lasing property of the light source can be controlled from being unstable when the reflection light returns to the light source side.

The light beam emitted from the anamorphic lens 3 becomes a light beam diverging in both of the main and sub scanning directions. The light beam emitted from the anamorphic lens 3 is again converted into parallel light in the main-scanning direction by a cylinder lens 7 which is a second optical element having a power only in the main-scanning direction and is arranged just after the anamorphic lens 3. Namely, the anamorphic lens 3 and the cylinder lens 7 constitute a beam expander in the main-scanning direction.

The light beam emitted from the anamorphic lens 3, in the sub-scanning direction, passes through the cylinder lens 7, and then is focused on a substantial deflection face (reflection face) 6a of the polygon mirror 6 which is a light deflector as a linear image which is long in the main-scanning direction by a cylinder lens 5 which is a third optical element having a power only in the sub-scanning direction. Then, this light beam is reflected by the deflection face 6a and is deflected and scanned in the main-scanning direction by the rotation of the polygon mirror 6.

If the anamorphic lens 3 and cylinder lens 5 are considered as one cylinder lens in the sub-scanning direction, the synthesis focal distance of the anamorphic lens 3 and the cylinder lens 5 is changed by adjusting the relative distance of the anamorphic lens 3 and the cylinder lens 5. In this state, if the anamorphic lens 3 and the cylinder lens 5 are adjusted in the optical axis direction, and the focused position of the linear image conforms to the position of the deflection face 6a of the polygon mirror 6, the conjugate arrangement relationship of the position of the deflection face 6a and the light source unit can be maintained. More specifically, in the sub-scanning direction, the anamorphic lens 3 and the cylinder lens 5 constitute a zoom lens. This configuration can be used for finely adjusting the magnification of the entire optical system including an after-described scanning optical element 27 in the sub-scanning direction, and can be used especially when using the light source 1 in which the light-emitting points are two-dimensionally arranged. Even if, the light source in which the light-emitting points are one-dimensionally arranged is used as described in the present embodiment, a mechanism for adjusting the rotation of the light source unit can be omitted.

The anamorphic lens 3 of the first optical element, the cylinder lens 7 of the second optical element and the cylinder lens 5 of the third optical element are bonded to a predetermined fastening member after the arrangement positions are adjusted. Thereby, a lens holding member can be omitted; thus, the costs can be controlled.

The polygon mirror 6 of the light deflector is housed in a housing 17 having a polygon mirror window 16. The rotation and driving of the polygon mirror 6 is controlled via a light deflector driving circuit 22 (polygon mirror driving circuit) in accordance with a rotation driving control signal 21 from the controller 20. In addition, the optical system before a light deflector comprises from the light source 1 to the polygon mirror window 16.

Figure 3A:
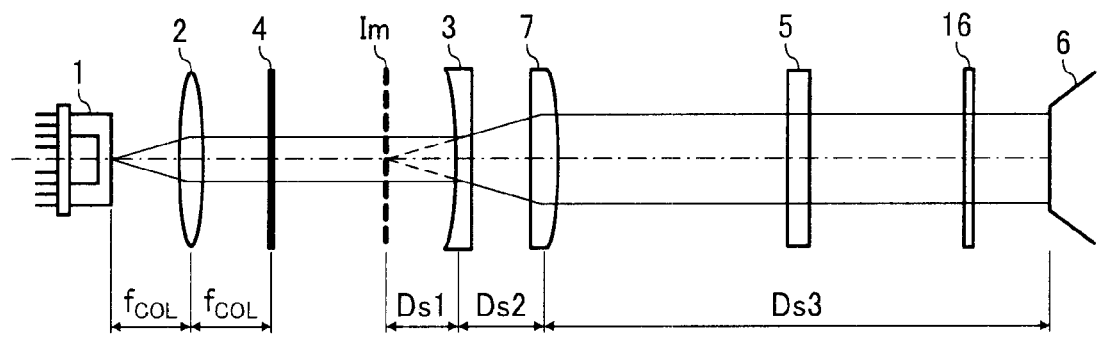
FIGS. 3A, 3B provide views each describing an optical system from the multi-beam light source to a light deflector in the optical scanner in FIG. 1.
Figure 3B:
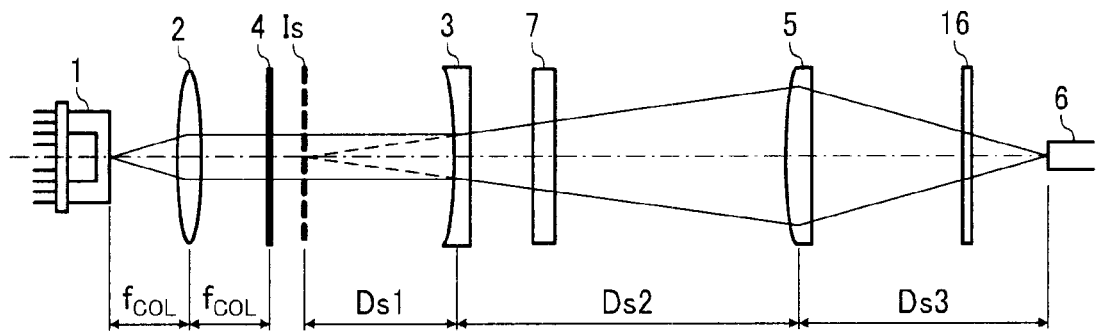

FIGS. 3A, 3B provide views each describing a change in a light beam in the optical system before a light deflector. FIG. 3A provides a view illustrating a change in a light beam in the main-scanning direction. FIG. 3B provides a view illustrating a change in a light beam in the sub-scanning direction. In addition, in order to simplify the views, only one light beam is illustrated in each of FIGS. 3A, 3B. More specifically, in the present embodiment, since the light source 1 includes the even number of light-emitting points, the center of the light-emitting points A1-A10 (the intermediate between the light-emitting points A5, A6) is set as a virtual light-emitting point Ac, and the light beam is illustrated as a light beam emitted from the light-emitting point Ac in FIGS. 3A, 3B. In this embodiment, the light source having 10 light-emitting points is described as an example; however, the number of light-emitting points is not limited to 10 as long as the light source has two or more light-emitting points.

When the light source includes the even number of light-emitting points, the main light beam emitted from the virtual light-emitting point located in the center of the light-emitting points passes on the optical axis of the optical system before a light deflector from the coupling lens 2 to the cylinder lens 5. When the light source includes the odd number of light-emitting points, the main light beam emitted from the light-emitting point located in the center of the light-emitting points passes on the optical axis of the optical system before a light deflector from the coupling lens 2 to the cylinder lens 5. In this case, the optical axis is an axis passing through the origin of a coordinate, which is set when expressing the incident and emission face shapes of each lens arranged in the optical system before a light deflector by an equation and a coordinate.

In FIG. 1, a plurality of light beams deflected and scanned by the polygon mirror 6 is focused in the main and sub scanning directions on a scanned surface (corresponding to a surface of a photoreceptor in an image forming apparatus) 13a of a scanned object (corresponding to a photoreceptor in an image forming apparatus) 13 by the scanning lens group (scanning optical element) 27, and scans on the scanned surface 13a. Then, each focused spot (not shown) on the scanned surface 13a is modulated, and the optical recording by the multi-beams is performed.

In the optical scanner illustrated in FIG. 1, a light detector 23 is arranged near the scanning start end (printing start end) which is one end portion of the scanned surface 13a. When performing the optical recording, it is necessary for a range from the light detector 23 to the scanning end (printing end) which is the end portion of an image recording sheet 24 having the maximum paper size opposite to the light detector 23 to be scanned in a state in which the quality of a focused spot is maintained. This range is an effective scanning width 26.

An optical face tangle error correction function is provided between the deflection face 6a of the polygon mirror 6 and the scanned surface 13a by establishing the optical conjugation in the sub-scanning direction. In the present embodiment, the scanning lens group 27 corresponds to the scanning optical system, and includes five lenses of glass lenses 8-11 and a transparent resin lens 12 arranged between the glass lens 11 and the scanned surface 13a.

In the above-described optical system, the data of the entire scanning optical system and the optical system before a light deflector is illustrated in the following Table 1, and the detailed data of the optical system before a light deflector is illustrated in the following Tables 2, 3. The items which are not specifically described illustrate values in the standard temperature (35° C.).

TABLE 1

| | |
|---|---|
| Light source wavelength | 660 nm |
| The number of light-emitting ponts of light source | 10 |
| Light source arrangement interval | 30 μm |
| Inclination angle of light emitting point array to deflecting and scanning face | 9° |
| Focal distance of coupling lens 2 | 65 mm |
| Focal distance of anamorphic lens 3 | Main: −5000.00 mm<br>Sub: −693.310 mm |
| Focal distance of cylinder lens 7 | Main: 5050.00 mm<br>Sub: ∞ |
| Focal distance of cylinder lens 5 | Main: ∞<br>Sub: 123.342 mm |
| The number of polygon mirror faces | 8 faces |
| Inscribed circle radius of polygon mirror | 45 mm |
| Incident angle to polygon mirror | 60° |
| Displacement of center of scanning lens | −0.960 mm |
| Focal distance of scanning lens (main-scanning direction) | 480.000 mm |
| Focal distance of scanning lens (sub and main scanning directions) | 84.874 mm |
| Magnification of scanning lens (sub-scanning lens) | 2.3 |
| Effective scanning width | 20 inch |
| Maximum scanning field angle | ±30 degree |
| Total width of opening in main-scanning direction | 8.65 mm |
| Total width of opening in sub-scanning direction | 5.31 mm |

TABLE 2

| Surface number | Curvature radius of main-scanning direction | Curvature radius of sub-scanning direction | Distance between surfaces | Refractive index (@661 nm) | Abbe's number νd |
|---|---|---|---|---|---|
| (1) | ∞ | | 63.106 | 1.000 | — |
| (2) | −7122.350 | | 3.0 | 1.586 | 61.2 |
| (3) | −37.896 | | 65.010 | 1.000 | — |
| (4) | ∞ | | 20.000 | 1.000 | — |
| (5) | −2635.232 | −365.406 | 3.000 | 1.527 | 56.0 |
| (6) | ∞ | | 46.053 | 1.000 | — |
| (7) | ∞ | | 3.000 | 1.513 | 64.1 |
| (8) | −2594.361 | ∞ | 50.000 | 1.000 | — |
| (9) | ∞ | 63.365 | 3.000 | 1.527 | 56.0 |
| (10) | ∞ | | 108.453 | 1.000 | — |
| (11) | ∞ | | 2.442 | 1.527 | 56.0 |
| (12) | ∞ | | 33.858 | 1.000 | — |

TABLE 3

| Surface number | Conical constant and coefficient of adding function |
|---|---|
| (2) | $k = +4.782565 \times 10^{+05}$ |
|  | $\alpha_4 = +1.046096 \times 10^{-06}$ |
| (3) | $k = +4.782565 \times 10^{+05}$ |
|  | $\alpha_4 = +9.779513 \times 10^{-07}$ |

As the lenses for use in the optical system before a light deflector, the coupling lens 2, the cylinder lens 7 of the second optical element and the cylinder lens 5 of the third optical element are made of glass, and the anamorphic lens 3 of the first optical element is made of resin. The glass material of the coupling lens 2, the cylinder lens 7 and the cylinder lens 5 includes, for example, L-BAL 35, S-BSL 7 and S-BSL 7 (registered trademark) manufactured by OHARA INC. (registered trademark).

The surface number (1) described in Table 2 denotes the light-emitting point of the light source, the surface numbers (2), (3) denote the incident face and the emission face of the coupling lens 2, respectively, the surface number (4) denotes the opening member, the surface numbers (5), (6) denote the incident face and the emission face of the anamorphic lens 3, respectively, the surface numbers (7), (8) denote the incident face and the emission face of the cylinder lens 7, respectively, the surface numbers (9), (10) denote the incident face and the emission face of the cylinder lens 5, respectively, and the surface numbers (11), (12) denote an incident face 16a and an emission face 16b of the polygon mirror window 16, respectively.

The coupling lens 2 is a rotation symmetric aspherical lens. The surface shape of the coupling lens 2 is expressed by the following Equation 1 where the optical axis direction is the z-axis and the surface vertical to the z-axis is the x-y plane.

$$z(x, y) = \frac{\frac{r^2}{r_0}}{1 + \sqrt{1 - (1 + k)\left(\frac{r}{r_0}\right)^2}} + \alpha_4 r^4 \quad \text{[Equation 1]}$$

In the above Equation 1, $r_0$ is a curvature radius, k is a conical constant, a4 is a coefficient of an adding function, and k, $\alpha_4$ of the incident and emission faces of the coupling lens 2 are values described in Table 3, respectively.

Next, the data of each lens of the scanning lens group 27 from the deflection face 6a of the polygon mirror 6 to the scanned surface 13a is illustrated in the following Table 4.

TABLE 4

| Surface number | Curvature radius of main-scanning direction | Curvature radius of sub-scanning direction | Distance between surfaces | Refractive index (@661 nm) | Abbe's number vd |
|---|---|---|---|---|---|
| (1) |  | ∞ | 27.872 | 1.000 | — |
| (2) |  | ∞ | 2.128 | 1.5137 | 64.1 |
| (3) |  | ∞ | 102.919 | 1.0000 | — |
| (4) |  | −329.270 | 23.000 | 1.6148 | 66.3 |
| (5) |  | −139.219 | 10.000 | 1.0000 | — |
| (6) |  | −140.782 | 12.00 | 1.7955 | 25.4 |
| (7) |  | −278.613 | 12.00 | 1.0000 | — |
| (8) |  | ∞ | 35.00 | 1.6348 | 55.4 |
| (9) | −304.421 | −182.272 | 14.00 | 1.0000 | — |
| (10) | ∞ | 160.719 | 10.00 | 1.5137 | 64.1 |
| (11) |  | ∞ | 62.70 | 1.0000 | — |
| (12) | 642.860 | 108.581 | 3.00 | 1.5270 | 56.0 |
| (13) | 660.986 | −98.048 | 405.31 | 1.0000 | — |
| (14) | — | — | — | — | — |

In Table 4, the surface number (1) denotes the deflection face 6a of the polygon mirror 6. The surface numbers (2), (3) denote the incident face 16a and the emission face 16b of the polygon mirror window 16 (in addition, the incident face 16a becomes the emission face of the light beam reflected on the deflection face 6a and the emission face 16b becomes the incident face of the light beam reflected on the deflection face 6a), respectively. The surface numbers (4)-(13) denote the faces of the lenses constituting the scanning lens group 27. More specifically, the surface numbers (4), (5) denote an incident face 8a and an emission face 8b of a bilateral spherical lens 8, respectively. The surface numbers (6), (7) denote an incident face 9a and an emission face 9b of a bilateral spherical lens 9, respectively. The surface numbers (8), (9) denote an incident face 10a and an emission face 10b of a toric lens 10, respectively. In this case, the incident face 10a of the surface number (8) is a plane and the emission face 10b of the surface number (9) is a toric face. The surface numbers (10), (11) denote an incident face 11a and an emission face 11b of a cylinder lens 11, respectively. In this case, the incident face 11a of the surface number (10) is a cylinder face in the sub-scanning direction and the emission face 11b of the surface number (11) is a plane. The surface numbers (12), (13) denote an incident face 12a and an emission face 12b of a bilateral aspherical lens 12, respectively, and the bilateral aspherical lens 12 has a negative refractive power in the sub-scanning direction. The surface number (14) denotes the scanned surface 13a.

The glass material of the bilateral spherical lens 8, the bilateral spherical lens 9, the toric lens 10 and the cylinder lens 11 includes, for example, s-PHM 52, S-TIH 6, S-BSM 18 and S-BSL 7 (registered trade mark) manufactured by OHARA INC. (registered trademark). The resin material of the bilateral aspherical lens 12 includes, for example, ZEONEZ E48R (registered trademark).

The incident face 12a and the emission face 12b of the bilateral ashperical lens 12 have aspherical shapes expressed by the following Equations 2, 3, where the main-scanning direction is x, the sub-scanning direction is y and the optical axis direction is z.

$$z(x, y) = \frac{\frac{2y^2}{\alpha r_y} - \frac{y^4}{\alpha^2 r_x r_y^2} + \frac{x^2}{r_x}}{1 + \sqrt{\left(1 - \frac{y^2}{\alpha r_x r_y}\right)^2 - \left(\frac{x}{r_x}\right)^2}} + \sum_{m,n} P_{mn} x^m y^n \quad [\text{Equation 2}]$$

$$\alpha = 1 + \sqrt{1 - (1 + k_y)\left(\frac{y}{r_y}\right)^2} \quad [\text{Equation 3}]$$

In the above Equations 2, 3, $r_x$ is a curvature radius of the main-scanning direction, $r_y$ is a curvature radius of the sub-scanning direction, and $k_y$ is a conical constant of the sub-scanning direction (where, $k_y=0$).

The first term of the right side of the Equation 2 expresses a basic toric shape, and the second term of the right side of the Equation 2 expresses an adding function which adds an optical axis asymmetric component to a basic shape. $P_{mn}$ in the Equation 2 is a constant which is provided by the data illustrated in the following Table 5. Thereby, the incident face 12a and the emission face 12b of the bilateral aspherical lens 12 become a non-circular curve of the optical axis symmetry in the main-scanning direction and a non-circular curve of the optical axis asymmetry in an arbitrary yz cross-section surface (main-scanning direction).

TABLE 5

| Surface number | Coefficient of adding function |
|---|---|
| (12) | $P_{02} = +4.6710150 \times 10^{-04}$ |
|  | $P_{12} = -2.4664885 \times 10^{-06}$ |
|  | $P_{40} = -4.9057053 \times 10^{-08}$ |
|  | $P_{22} = +5.7586284 \times 10^{-09}$ |
|  | $P_{04} = +2.2463570 \times 10^{-06}$ |
|  | $P_{32} = -9.6777370 \times 10^{-10}$ |
|  | $P_{60} = +3.4541456 \times 10^{-13}$ |
|  | $P_{42} = +4.5653360 \times 10^{-12}$ |
|  | $P_{24} = -1.4714310 \times 10^{-10}$ |
|  | $P_{52} = +2.5235282 \times 10^{-14}$ |
|  | $P_{80} = +5.9316774 \times 10^{-18}$ |
|  | $P_{62} = -6.7871729 \times 10^{-18}$ |
| (13) | $P_{02} = +9.7846113 \times 10^{-03}$ |
|  | $P_{12} = -2.7594398 \times 10^{-06}$ |
|  | $P_{40} = -4.8183110 \times 10^{-08}$ |
|  | $P_{22} = +5.8575203 \times 10^{-08}$ |
|  | $P_{04} = +2.8275313 \times 10^{-06}$ |
|  | $P_{32} = -9.7485755 \times 10^{-10}$ |
|  | $P_{60} = +3.5952321 \times 10^{-13}$ |
|  | $P_{42} = +4.2807560 \times 10^{-12}$ |
|  | $P_{24} = -1.5430625 \times 10^{-10}$ |
|  | $P_{52} = +2.5093318 \times 10^{-14}$ |
|  | $P_{80} = +5.7073761 \times 10^{-18}$ |
|  | $P_{62} = -3.2181817 \times 10^{-19}$ |

In the above description, the scanning lens group 27 includes five lenses; however, the number of the lenses is not limited thereto.

Figure 8A:
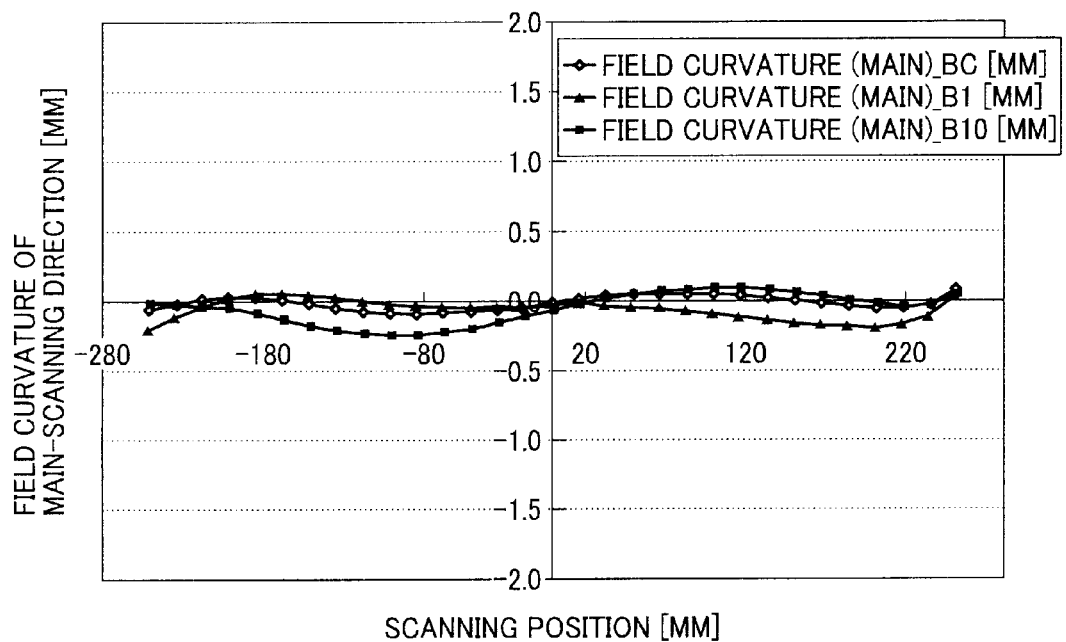
FIGS. 8A-8E provide graphs each illustrating an optical feature of a scanning optical system in the optical scanner in a thermoneutral environment (35° C.).
Figure 8B:
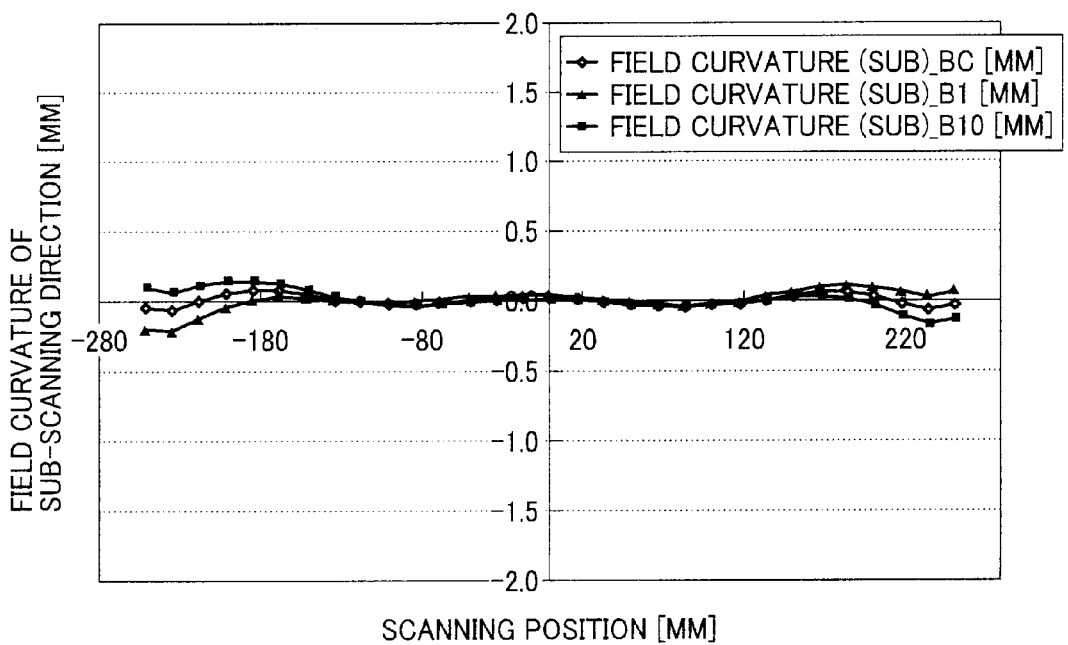
Figure 8C:
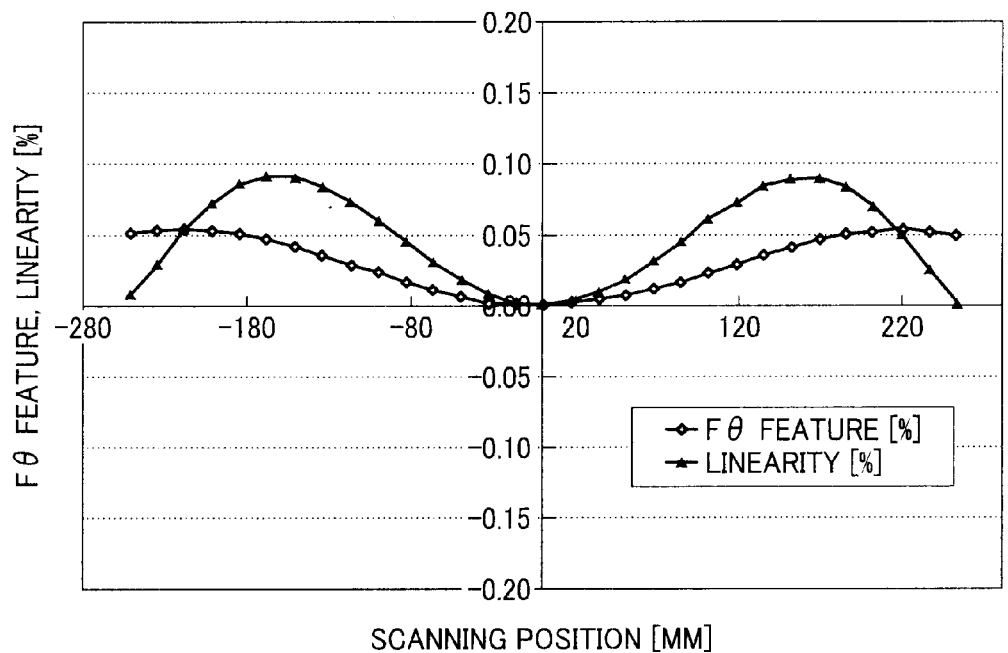
Figure 8D:
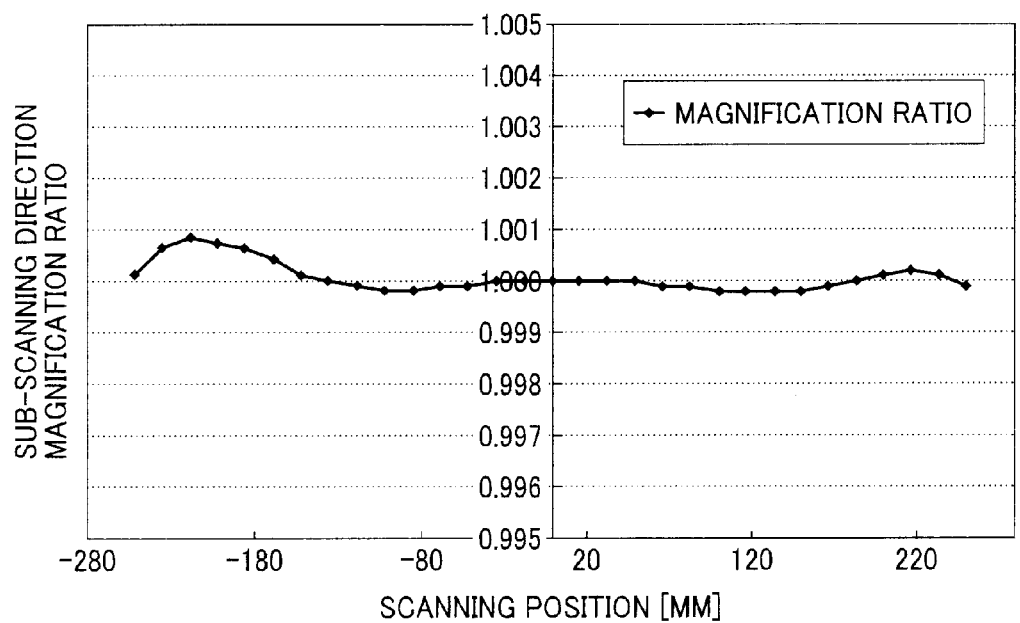
Figure 8E:
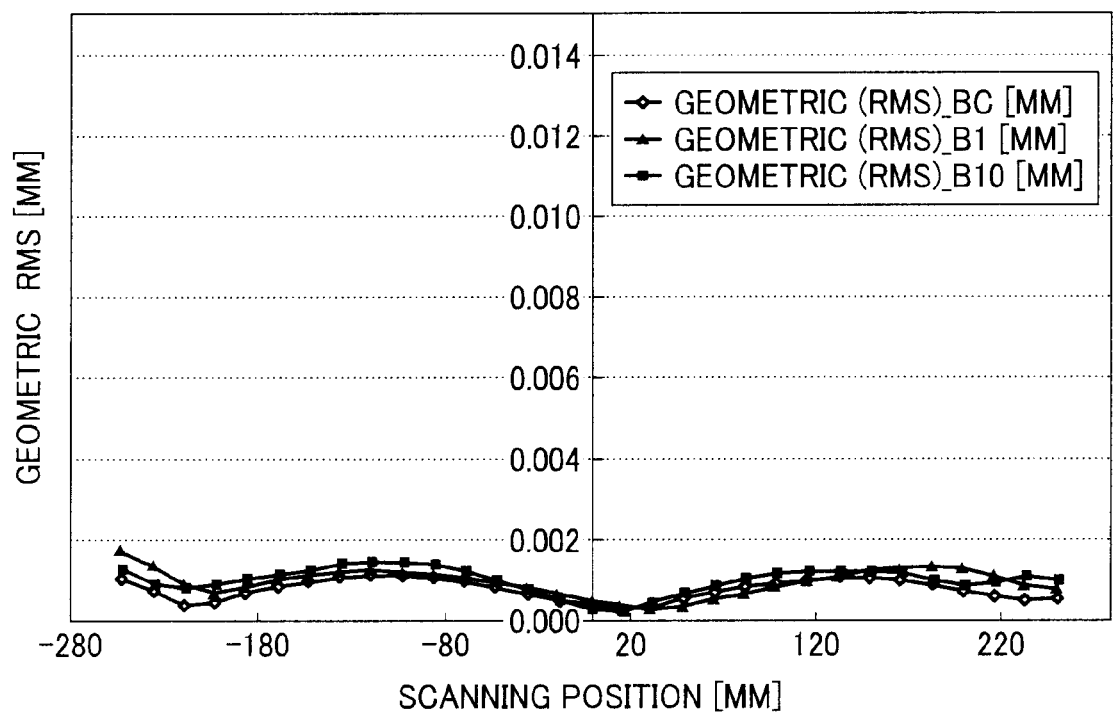

FIGS. 8A-8E provide graphs each illustrating an optical feature of the scanning optical system in the optical scanner. FIG. 8A provides a graph illustrating a relationship between a scanning position on the scanned surface 13 and field curvature of the main-scanning direction. FIG. 8B provides a graph illustrating a relationship between a scanning position on the scanned surface 13 and field curvature of the sub-scanning direction. In the graphs, the reference numbers B1, Bc, B10 denote the data of the light beams from the left end of A1, the virtual center of Ac and the right end of A10, respectively, in the light emitting points A1-A10 illustrated in FIG. 2. The scanning width is about ±250 [mm]. FIG. 8C provides a graph illustrating a scanning position on the scanned surface 13 and Fθ and linearity features. FIG. 8D provides a graph illustrating a relationship between a scanning position on the scanned surface 13 and a magnification ratio of the sub-scanning direction (position of field angle of 0° as standard), and the magnification ratio gap in the scanning width is ±0.1% or below. FIG. 8E provides a graph illustrating a relationship between a scanning position on the scanned surface 13 and a focusing performance (RMS (Root Mean Square)).

Figure 4:
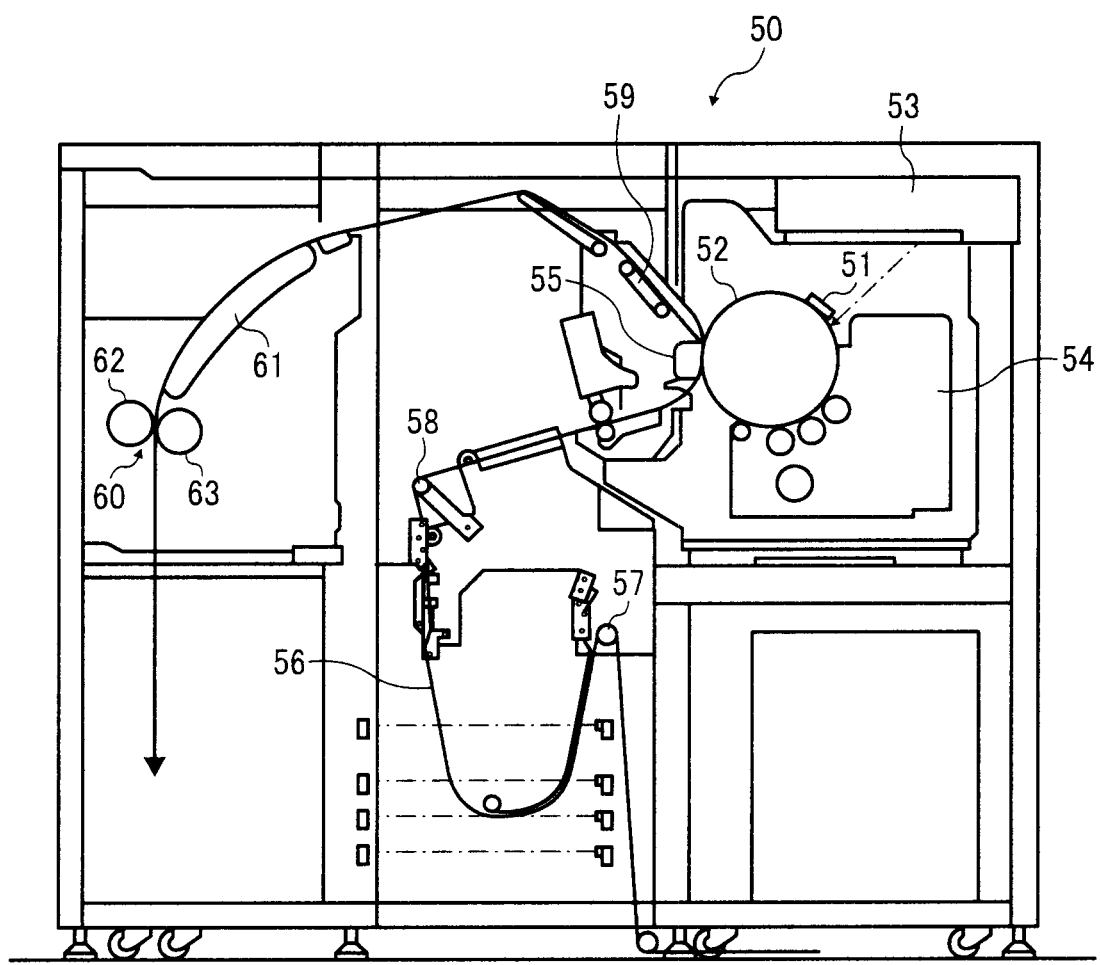
FIG. 4 provides a schematic view illustrating an image forming apparatus according to one embodiment of the present invention.

FIG. 4 provides a schematic view illustrating an image forming apparatus according to the embodiment of the present invention. As illustrated in FIG. 4, an image forming apparatus 50 includes a photoreceptor 52, a charger 51 which charges the surface of the photoreceptor 52, an optical scanner 53 which forms an electrostatic latent image by irradiating light on the charged surface of the photoreceptor 52, a development station 54 which forms a toner image by toner adhered on the electrostatic latent image, a transfer station 55 which transfers the toner image on the photoreceptor on an image recording sheet 56 of a recording medium, and a fuser 60 which fuses the toner image on the recording medium. As the optical scanner 53, the optical scanner according to the embodiment of the present is used.

Hereinafter, the image formation in the image forming apparatus 50 will be described. The laser light from the optical scanner 53 is irradiated on the surface of the photoreceptor drum 52 charged by the charger 51, so that the electrostatic latent image is formed. In this case, the laser light irradiates the surface of the photoreceptor drum 52 at a predetermined incident angle relative to the normal line of the surface of the photoreceptor drum 52. The photoreceptor drum 52 in which the electrostatic latent image is formed rotates in the clockwise direction, and the electrostatic latent image is developed by toner of the development station 54, so that the toner image is formed. Meanwhile, by carriers 57-59, the image recording sheet 56 is carried from a paper tray and the like, and is pressed to the photoreceptor drum 52 in the transfer station 55, and the toner image on the photoreceptor drum 52 is transferred onto the image recording sheet 56. Then, the image recording sheet 56 is fed to the fuser 60. The fuser 60 includes a preheater 61, a heat roller 62 and a backup roller 63, and the image recording sheet 56 is heated and pressed by these rollers, so that the toner image on the image recording sheet 56 is fused. Thereby, an image is formed on the image recording sheet 56.

Namely, the charger 51 corresponds to a charging unit which charges the surface of the photoreceptor drum 52. The photoreceptor drum 52 also corresponds to a photoreceptor. The optical scanner 53 corresponds to an optical scanning unit which forms the electrostatic latent image by irradiating light on the surface of the photoreceptor drum 52 charged by the charger 51. The development station 54 corresponds to the development unit which forms the toner image by the toner adhered on the electrostatic latent image on the photoreceptor drum 52. The transfer station 55 corresponds to the transfer unit which transfers the toner image on the photoreceptor drum 52 on the image recording sheet 56. The fuser 60 corresponds to a fusing unit which fuses the toner image on the image recording sheet 56.

The photoreceptor drum 52 from which the toner image is transferred onto the image recording sheet 56 rotates so as to repeat the image forming process (charging, exposure, development, transfer and fusing), and the image recording sheet 56 is sequentially supplied from the paper tray and the like, and a similar image formation process is intermittently performed.

Figure 5:
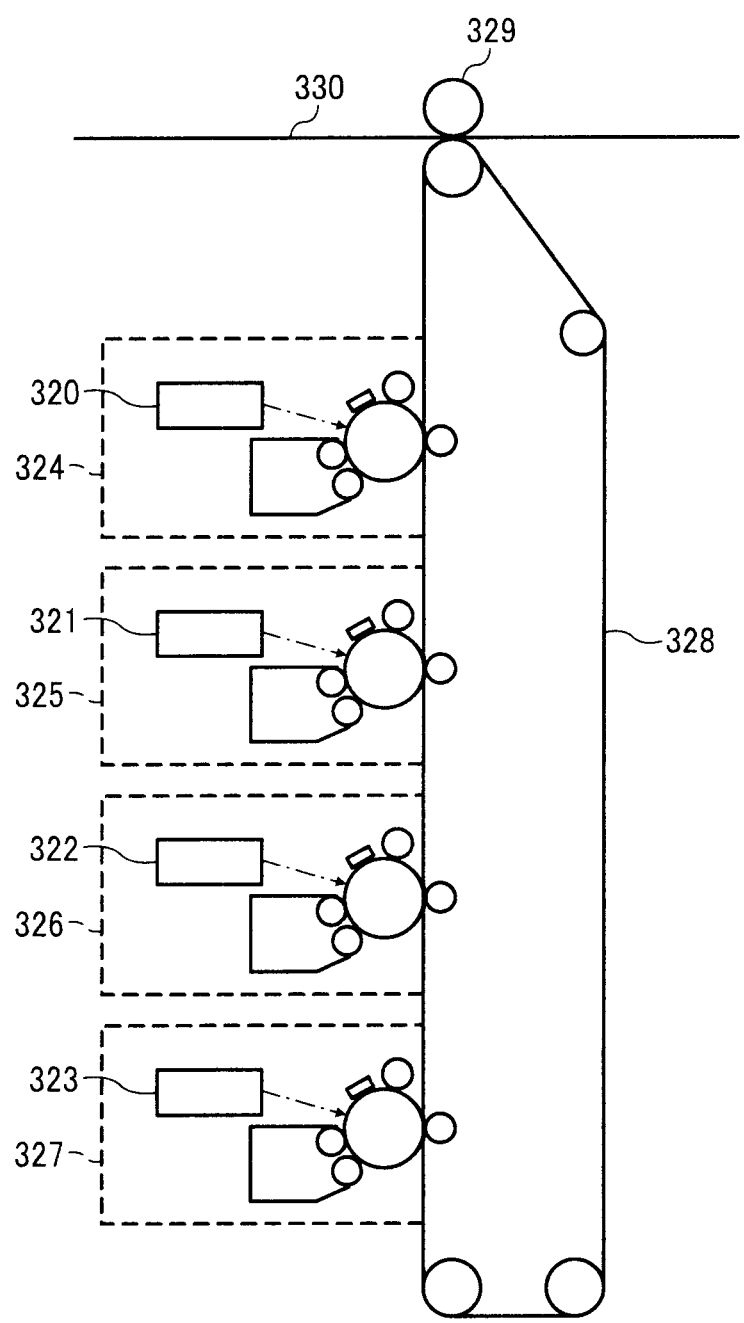
FIG. 5 provides a schematic view illustrating an image forming apparatus according to another embodiment of the present invention.

The image forming apparatus in this embodiment may be an image forming apparatus for a color image having a plurality of photoreceptors, optical scanning units, development units, transfer units and the like. FIG. 5 provides a view illustrating an example of a full-color image forming apparatus including four optical scanners. In FIG. 5, each of the reference numbers 320-323 denotes the optical scanner according to the embodiment of the present invention, and each of the reference numbers 324-327 denotes the development station including the optical scanner, the photoreceptor drum, and the development station and the like. These are arranged in the vertical direction. These development stations 324-327 correspond to a plurality of colors, for example, cyan, magenta, yellow and black. The toner image formed on the photoreceptor drum by each development station is transferred onto a belt-like intermediate transfer body 328, and is overlapped, so that a full-color toner image is formed. This toner image is transferred to an image recording sheet 330 by a transfer device 329, and is fused by a not shown fusing device, so that the full-color image is formed.

In the full-color image forming apparatus using a multi-beam scanner, if the size of the beam spot which scans the scanned surface varies or if the intervals of the scanning lines vary, the quality of the formed image is deteriorated. Especially, in the color image forming device, if the intervals of the scanning lines vary for each color (hereinafter, referred to as color shift), the color phase is changed and the irregular color is generated. For this reason, it is necessary to adjust a beam diameter and intervals of scanning lines to predetermined values in the early stages, so as to stably maintain the adjusted state over time. A factor of a change over time includes a change in a feature of an optical element by environmental temperature change. In particular, a change in a wavelength of a semiconductor laser and a change in a refractive index of a resin optical element have significant influence on the change over time. In the present embodiment, the intervals of the scanning lines are adjusted in the early stages by the zoom lens including the anamorphic lens 3 and cylinder lens 5, and the temporal stability of the beam diameter and the scanning line intervals are compensated by the anamorphic lens 3.

In general, the refractive power of the lens is determined by the shape (curvature radius, thickness) and the refractive index (function of wavelength to be used). If a semiconductor laser is used for a light source, the oscillation wavelength shifts to the long wavelength side in accordance with an increase in temperature. If a resin element is used for an optical system, the refractive index is decreased in accordance with a decrease in temperature. Consequently, if a resin lens having a positive power is used for a lens system, the increase in temperature functions to shift an image face position to a back side (light traveling direction).

Figure 11A:
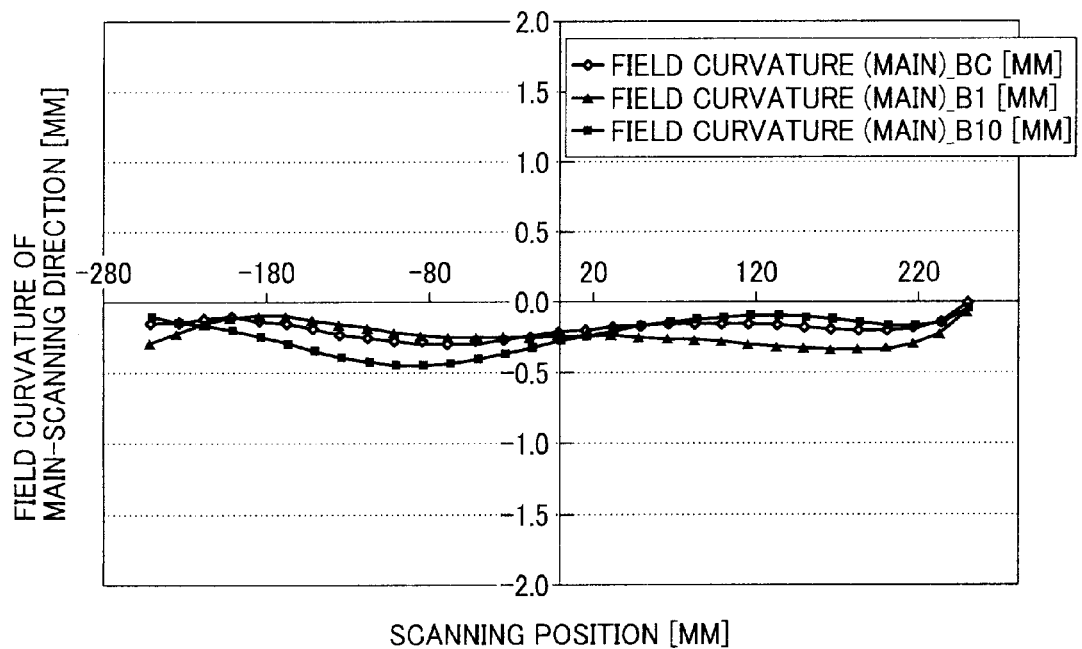
FIGS. 11A, 11B provide graphs each illustrating a field curvature feature in a low temperature environment (10° C.) when all lenses in an optical system before a light deflector are made of glass.
Figure 11B:
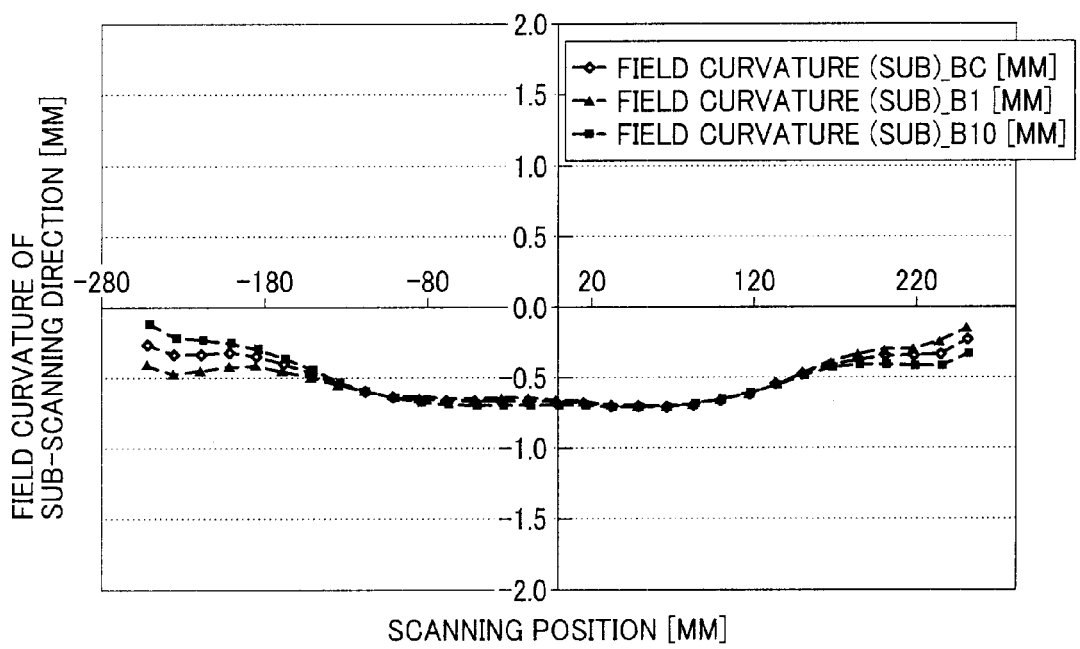
Figure 12A:
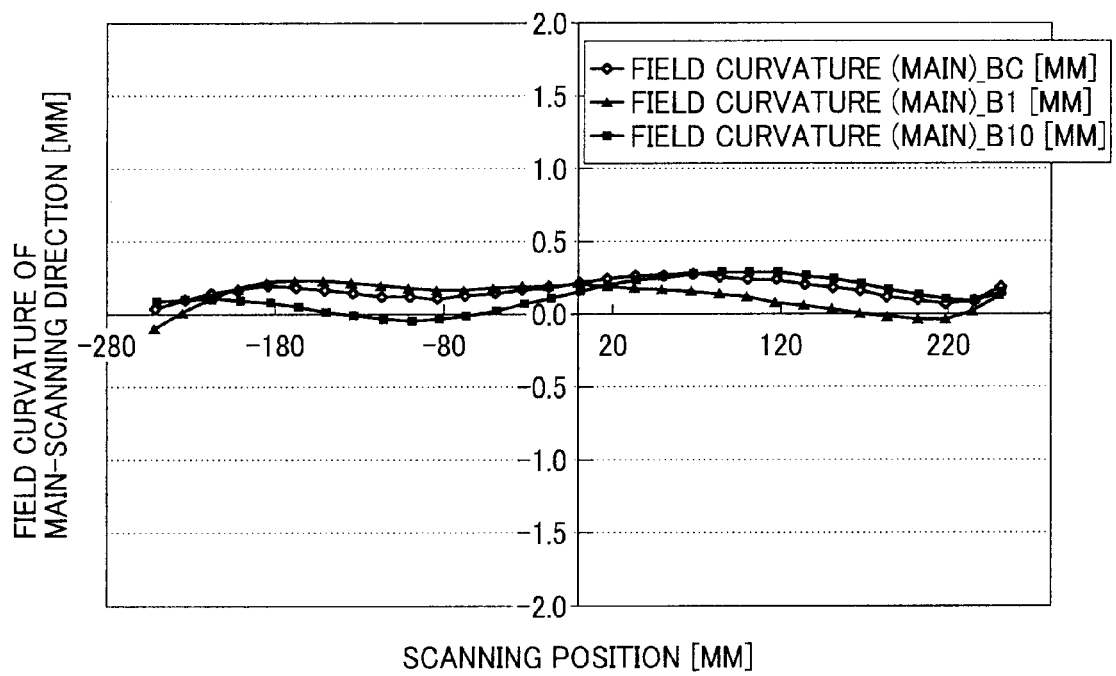
FIGS. 12A, 12B provide graphs each illustrating a field curvature feature in a high temperature environment (60° C.) when all lenses in the optical system before a light deflector are made of glass.
Figure 12B:
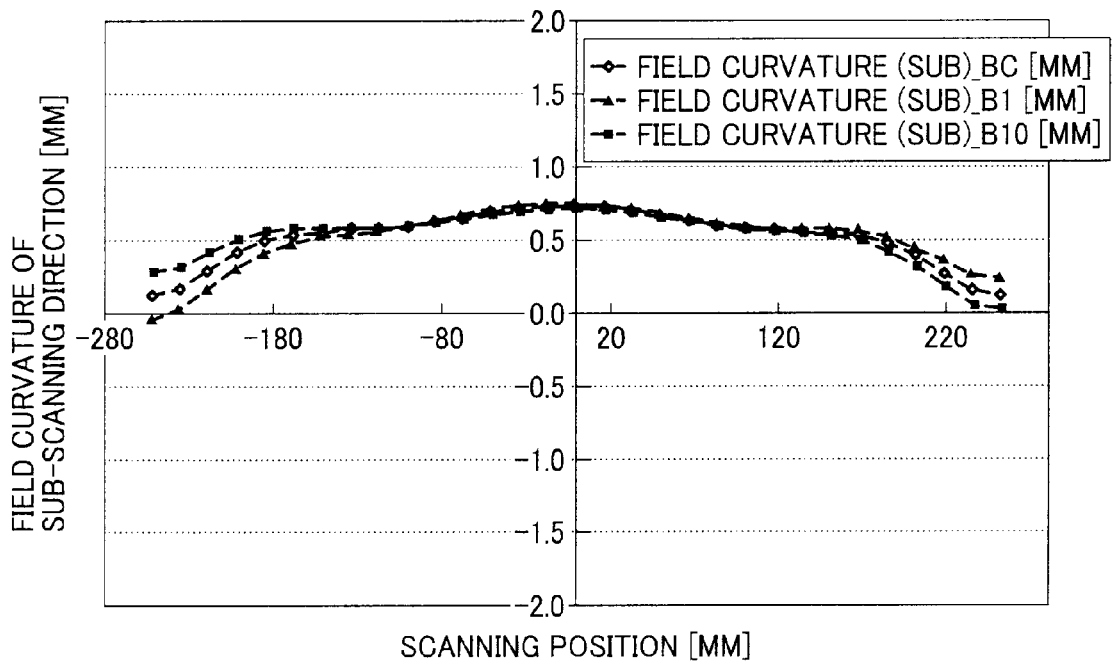

FIGS. 11A, 11B provide graphs each illustrating a field curvature feature in the main-scanning direction (FIG. 11A) and a field curvature feature in the sub-scanning direction (FIG. 11B) in a low temperature environment (environment temperature 10° C., oscillation wavelength of light source 657 nm) when all of the lenses in the optical system before a light deflector are made of glass. FIGS. 12A, 12B provide graphs each illustrating a field curvature feature in the main-scanning direction (FIG. 12A) and a field curvature feature in the sub-scanning direction (FIG. 12B) in a high temperature environment (temperature environment 60° C., oscillation wavelength of light source 665 nm). The refractive index change $\Delta n$ of the resin lens in the scanning optical system is $\Delta n=0.005$ [$1/50°$ C.]. In this case, the focused position shifts to the positive side (light traveling direction) both in the main-scanning direction and the sub-scanning direction by an increase in temperature. In this case, the influence of the shift is large in the sub-scanning direction, and the shift amount near the center of the scanning position (difference between FIG. 11B and FIG. 12B) becomes about 1.5 mm (p·p).

Figure 9A:
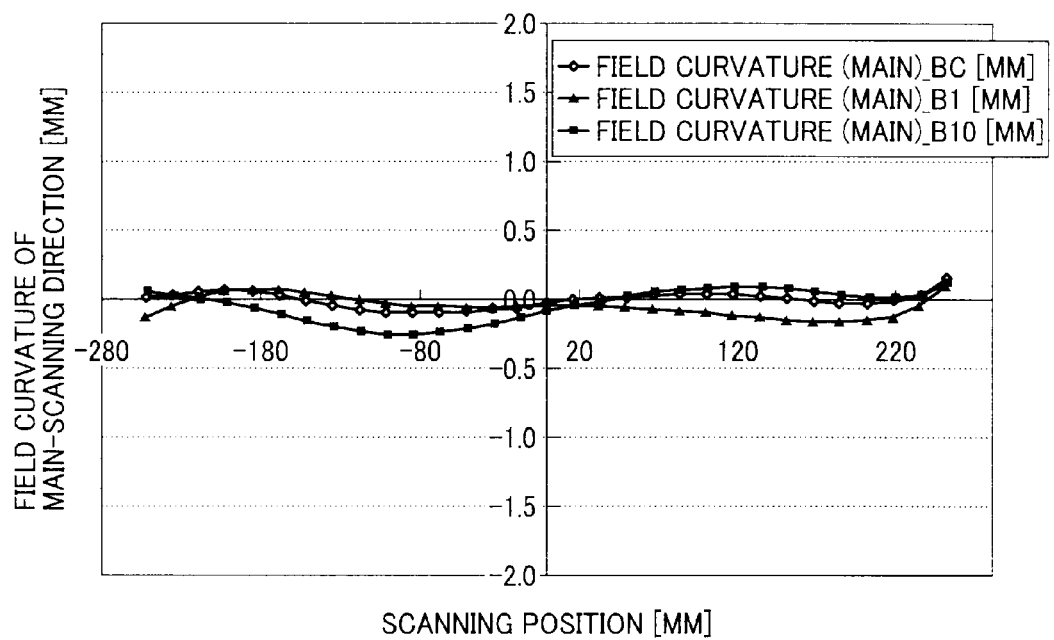
FIGS. 9A, 9B provide graphs each illustrating a field curvature feature of the scanning optical system in the optical scanner in a low temperature environment (10° C.).
Figure 9B:
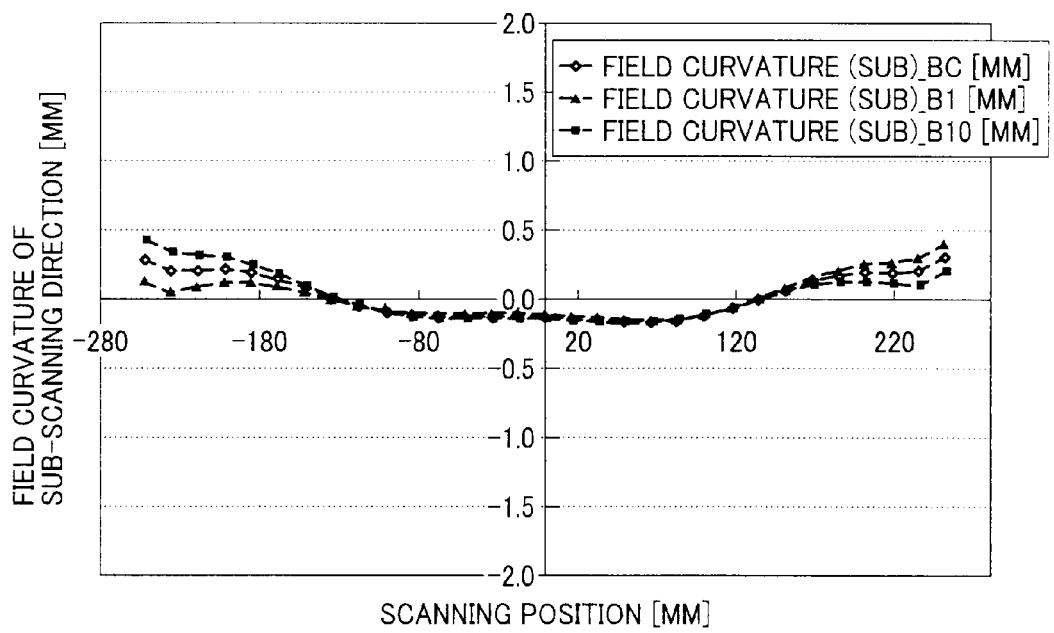
Figure 10A:
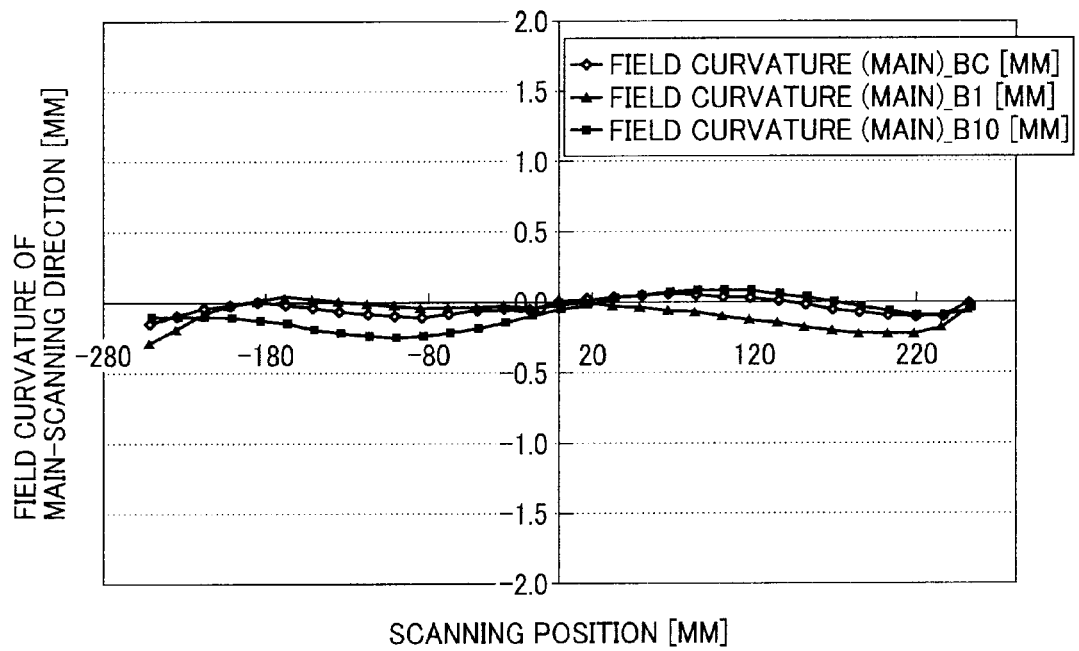
FIGS. 10A, 10B provide graphs each illustrating a field curvature feature of the scanning optical system in the optical scanner in a high temperature environment (60° C.).
Figure 10B:
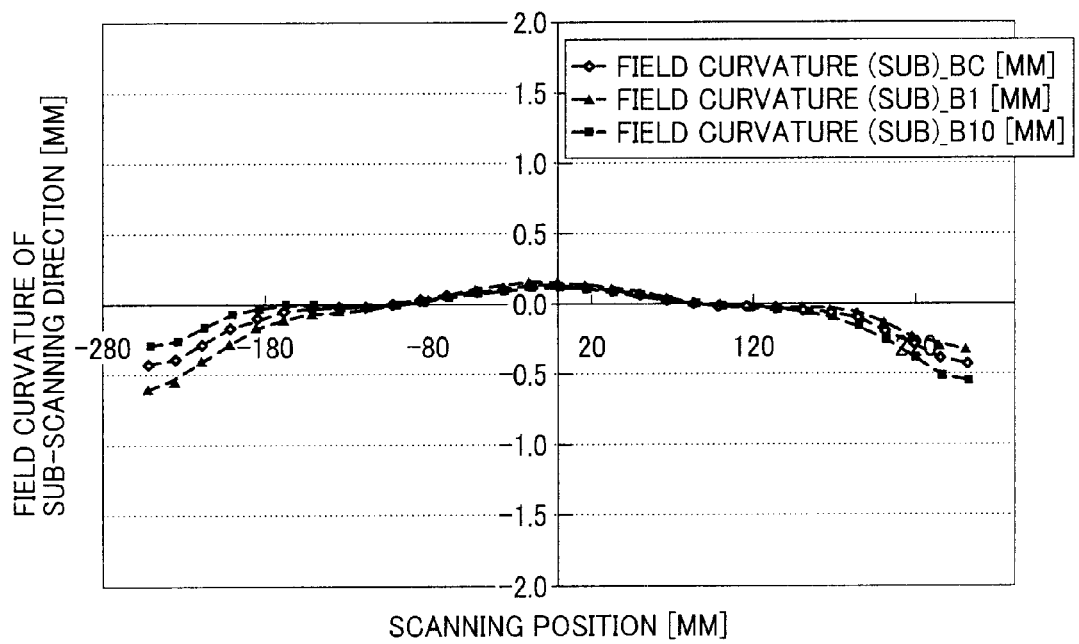

According to the present embodiment, in the optical scanner, the shift of the focused position by the changes in environmental temperature is corrected by using the resin anamorphic lens 3 of the optical system before a light deflector and setting the power of the anamorphic lens 3 to cancel the power change of the optical system in addition to the anamorphic lens 3 with the changes in the temperature. FIGS. 9A, 9B provide graphs each illustrating a curvature radius feature in the main-scanning direction (FIG. 9A) and a curvature radius feature in the sub-scanning direction (FIG. 9B) in a low temperature environment (temperature environment 10° C., oscillation wavelength of light source 657 nm) when the only anamorphic lens 3 of the optical system before a light deflector is replaced by resin. FIGS. 10A, 10B provide graphs each illustrating a field curvature feature in the main-scanning direction (FIG. 10A) and a field curvature feature in the sub-scanning direction (FIG. 10B) in a high temperature environment (temperature environment 60° C., oscillation wavelength of light source 665 nm). The field curvature is controlled to about 0.5 mm (p.p) in the main-scanning direction and about 1.0 mm (p.p) in the sub-scanning direction in the entire scanning range. In addition, the correction (temperature compensation) by the anamorphic lens 3 controls not only the field curvature but also the changes in the scanning line intervals.

As described above, in the optical scanner according to the embodiment of the present invention, the environmental stability of the performance can be maintained. When a plurality of anamorphic lenses is used for an optical system, the cylindrical lens 7 of the second optical element and the scanning lens group 27 in the optical scanner according to the embodiment of the present invention satisfy the following condition with respect to the influence of the arrangement gap of the anamorphic lens, so that this influence can be controlled. Namely, where the absolute value of the power of the main-scanning direction of the cylinder lens 7 is $|\phi m\ 2|$ and the absolute value of the power of the sub-scanning direction of the scanning lens group 27 in the central portion of the main-scanning direction is $|\phi F\ m|$, $|\phi m\ 2|<|\phi F\ m|$, i.e., $|\phi m\ 2|/|\phi F\ m|<1$ is satisfied. In this case, "central portion of main-scanning direction" is a central image height, i.e., a position where a deflected light beam vertically enters a scanned surface. The absolute value of the power of the scanning lens group in the sub-scanning direction by which the light beam incident on the central image height is influenced (in a plurality of lenses, it is considered as one lens in which a plurality of lenses is synthesized) is $|\phi F\ m|$.

In the optical scanner of the present embodiment, from Table 1, $|\phi m\ 2|/|\phi F\ m|<0.095$ is obtained. This value is a conjugate ratio of the intermediate focused point Im (virtual point) of the anamorphic lens 3 in FIG. 3A and the scanned face. Namely, in the main-scanning direction of the optical scanner, from Im to the scanned surface becomes a reduced system. Thereby, the influence of the arrangement angle error of the anamorphic lens 3 about the optical axis and the arrangement error in the optical axis vertical direction can be eased. This contributes to the decrease in the number of positions which adjust the positions of the lenses constituting the optical system before a light deflector and the decrease in the number of adjustment processes.

In the optical scanner of the present embodiment, the conjugate ratio of the intermediate focused point (Is in FIG. 3B) of the sub-scanning direction by the anamorphic lens 3 and the scanned surface is set to 1 or below. From Table 1 to Table 4, the conjugate ratio of Is and the scanned surface is 0.47, and the conjugate ratio is set to a reduced system in the sub-scanning direction, so that the arrangement error sensitivity is controlled.

Moreover, in the optical scanner of the present embodiment, it is preferable for the anamorphic lens 3 of the first optical element to satisfy the condition of $|\phi m\ 1|\leq|\phi s\ 1|$. In addition, $|\phi m\ 1|$ expresses an absolute value of a power of the deflecting and scanning direction of the anamorphic lens 3 of the first optical element and $|\phi s\ 1|$ expresses an absolute value of a power of the deflecting and scanning direction. From the above equation, by setting the power of the main-scanning direction ($\phi s\ 1$) and the power of the sub-scanning direction ($\phi m\ 1$) to asymmetry, and reducing any of the powers, the arrangement error sensitivity on the reduced power side can be controlled. In this embodiment, $|\phi s\ 1|/|\phi m\ 1|\approx 0.14$, and the power of the main-scanning direction is about 1/7 of the power of the sub-scanning direction. Therefore, the influence on the optical features by the arrangement error of the anamorphic lens 3 is reduced in the error of the main-scanning direction compared to the error of the sub-scanning direction, and the assembly adjustment items and the number of processes can be reduced.

As described above, the optical scanner of the present embodiment includes the temperature correction function and the adjustment function of the magnification in the sub-scanning direction. In the optical scanner of the present embodiment, the influence on the intervals of the scanning lines formed on the scanned surface and on the focused spot diameter of the scanned surface by the arrangement error of a plurality of anamorphic lenses can be reduced, and the deterioration in the image quality with the changes in temperature can be controlled. According to the image forming apparatus using the optical scanner of the present embodiment, the quality of the formed image can be improved in the early stages and the quality of the formed image is stabilized over time.

According to the embodiment of the present invention, the optical scanner which can control the deterioration in the image quality with the changes in temperature by reducing the influence on the scanning line intervals to be formed on the scanned surface and the focused spot diameter on the scanned surface by the arrangement error of the anamorphic lenses in the optical system having the adjustment function of the sub-scanning direction magnification and the temperature correction function by the anamorphic lenses, and the image forming apparatus including the optical scanner can be provided. In addition, with the image forming apparatus including the optical scanner, the quality of the formed image can be improved in the early stages, and the quality of the formed image can be stabilized over time.

What is claimed is:

1. An optical scanner, which scans at least one scanned face by a light beam, comprising:
    a light source having a plurality of light emitting points;
    an optical system before a light deflector configured to form a plurality of light beams from the light source;
    a light deflector configured to deflect the light beams via the optical system before a light deflector and scan the deflected light beams; and
    a scanning optical system configured to focus on the scanned face the light beams deflected and scanned by a deflection face of the light deflector,
    the optical system before a light deflector including the following elements arranged in order from the light source: a coupling lens, a first optical element having a negative power at least in a deflecting and scanning vertical direction, wherein the coupling lens is configured to guide the light beam from the light source to the first optical element, a second optical element having a power only in a deflecting and scanning direction and a third optical element having a power only in the deflecting and scanning vertical direction, wherein
    the second optical element and the scanning optical system satisfy the following condition, where $|\phi m\ 2|$ is an absolute value of a power of the deflecting and scanning direction of the second optical element and $|\phi F\ m|$ is an absolute value of a power of the deflecting and scanning direction of the scanning optical system in a central portion of the deflecting and scanning direction, $|\phi m\ 2|<|\phi F\ m|$.

2. The optical scanner according to claim 1, wherein a conjugate ratio of an intermediate focused point of the deflecting and scanning vertical direction by the first optical element and the scanned face is 1 or below.

3. The optical scanner according to claim 1, wherein the first optical element satisfies the following condition where $|\phi m\ 1|$ is an absolute value of a power of the first optical element in the deflecting and scanning direction and $|\phi s\ 1|$ is an absolute value of a power of the first optical system in the deflecting and scanning vertical direction, $|\phi m\ 1|\leq|\phi s\ 1|$.

4. The optical scanner according to claim 1, wherein the first optical element is a resin lens.

5. The optical scanner according to claim 4, wherein the first optical element is an anamorphic lens.

6. The optical scanner according to claim 1, wherein an incident face of the first optical element is a concave face or a convex face.

7. The optical scanner according to claim 1, wherein the first optical element, the second optical element and the third optical element are fastened to predetermined positions.

8. The optical scanner according to claim 1, wherein the light source is a light source array in which a plurality of light-emitting points is one-dimensionally arranged at predetermined intervals.

9. The optical scanner according to claim 8, wherein the light source array is an edge-emitting semiconductor laser array.

10. The optical scanner according to claim 8, wherein the light source is a light source in which the light beams from the light source arrays are synthesized.

11. The optical scanner according to claim 1, wherein the light source is a two-dimensional light source array in which a plurality of light emitting point arrays each having a plurality of light emitting points one-dimensionally arranged at predetermined intervals are arranged at predetermined intervals.

12. The optical scanner according to claim 11, wherein the two-dimensional light source array is a surface-emitting laser array.

13. An image forming apparatus, comprising:
- a photoreceptor;
- a charging unit configured to charge a surface of the photoreceptor;
- an optical scanning unit configured to form an electrostatic latent image by irradiating light on the charged surface of the photoreceptor;
- a development unit configured to form a toner image by toner adhered on the electrostatic latent image;
- a transfer unit configured to transfer the toner image on the photoreceptor onto a recording medium; and
- a fusing unit configured to fuse the toner image on the recording medium, wherein the optical scanning unit is the optical scanner according to claim 1.

14. The image forming apparatus according to claim 13, further comprising:
- a plurality of photoreceptors including the photoreceptor;
- a plurality of charging units including the charging unit;
- a plurality of optical scanning units including the optical scanning unit; and
- a plurality of development units including the development unit,
- the photoreceptors, the charging units, the optical scanning units and the development units corresponding to respective colors for forming a color image.

* * * * *